United States Patent [19]
Flis

[11] 3,816,691
[45] June 11, 1974

[54] EASILY REPLACEABLE EDM ELECTRODE

[76] Inventor: Albert J. Flis, 13661 Bellbrook Road, Brookpark, Ohio 44142

[22] Filed: Mar. 4, 1971

[21] Appl. No.: 120,911

[52] U.S. Cl. ........... 219/69 E, 204/143 M, 287/104
[51] Int. Cl. ........................... B23p 1/08, B23p 1/04
[58] Field of Search ............................. 287/65, 104; 219/69 D, 69 E, 69 V; 204/143 R, 143 M

[56] References Cited
UNITED STATES PATENTS

| 53,219 | 3/1866 | Fawcett | 287/104 |
| 189,120 | 4/1877 | McClintock | 287/104 |
| 2,441,319 | 5/1948 | Harding | 219/69 V |
| 2,580,398 | 1/1952 | Braswell | 219/69 V X |

*Primary Examiner*—R. F. Staubly
*Attorney*—Walter J. Monacelli

[57] ABSTRACT

The device described herein comprises an easily assembled, automatically registered disposable junction particularly suitable for replaceable electrodes used in spark erosion machining. The junction comprises two shanks having their abutting ends shaped so that the two shanks cannot be separated when a close-fitting sleeve is positioned to embrace a substantial portion of each of the two abutting shanks.

2 Claims, 3 Drawing Figures

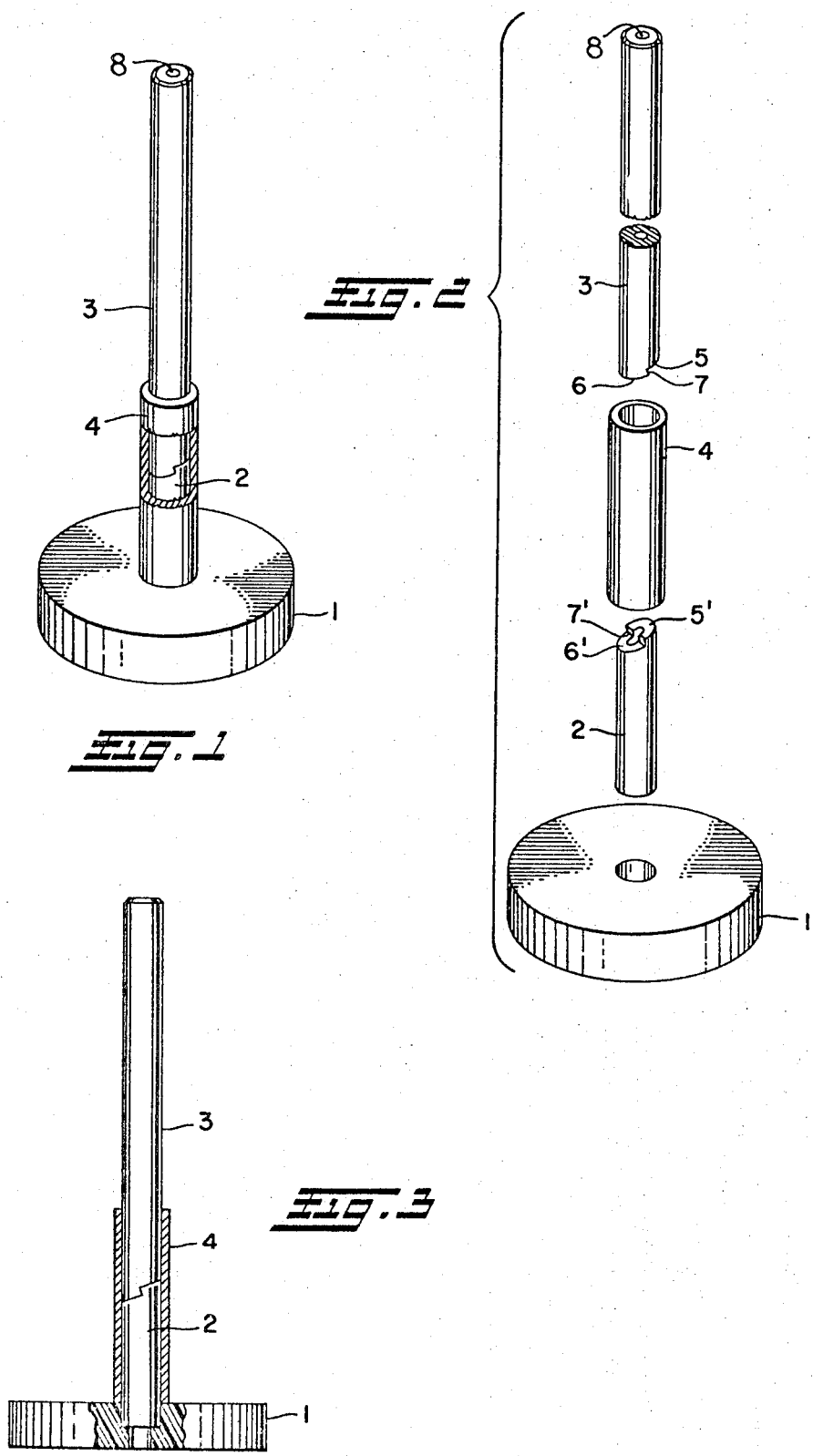

EASILY REPLACEABLE EDM ELECTRODE

BACKGROUND OF THE INVENTION

1. Field of the Invention

This invention relates to an easily assembled junction. More specifically, it applies to an easily assembled, automatically registered, easily removed junction for attaching various devices to a fixed uppershank for the period while the device is to be used. Still more specifically, it relates to easily replaceable disposable electrodes for spark erosion machining.

2. Related Prior Art

In many mechanical and electrical operations a device is attached temporarily to a piece of equipment through a connecting shank for a temporary use. Then the device is removed for replacement by another device or devices to perform subsequent operations. Typical of such operations is the disposable electrode used in spark erosion machining. This is also referred to as electrical discharge machinery in which a shaped electrode is positioned above a metal piece in which the shape of the electrode is to be cut into the metal. This cutting is effected by the erosion caused by the electrical discharge between the electrode and the metal object. Generally, oil is fed into the area being eroded so as to flush away metal particles as they are removed from the metal object.

In such devices, the electrode is attached through a collet chuck holder which requires insertion of the electrode shaft into the chuck holder and turning of the chuck holder to tighten the chuck holder onto the shaft. This not only requires the turning operation, but also requires that the electrode be adjusted and positioned so that it will register with the metal piece in the exact position in which the opening in the piece is to be placed.

In addition to the time lost and the care that must be exerted in attaching and positioning the electrode, the entire shaft of the electrode is discarded when the electrode is thrown away.

STATEMENT OF THE INVENTION

In the junction of the present invention, an upper shank is more or less permanently attached to the electrical discharge machine by means of the same type of collet chuck holder or other connecting device and is connected to the disposable electrode through a relatively short lower shank. The junction consists of an upper shank which can be more or less permanently fixed in position to serve as the upper part of a number of replaceable or disposable electrodes or other devices, a lower shank which is mounted on the disposable electrode or other device to be connected, and the disposable electrode itself or other device which is joined indirectly through the lower shaft to the upper shaft to serve the particular function desired, and a sleeve adapted to slide over the upper shank and over the lower shank when in position, having a length sufficient to embrace substantial portions of both the lower shank and the upper shank, the adjoining ends of the upper and lower shanks comprising flat surfaces having an angle of at least 1° and preferably at least 6° with the linear axis of the respective shanks. These two flat surfaces are in planes parallel to each other and are joined by a lip whose surface is at an angle of approximately 90° with the flat surfaces. The angles of the flat surfaces in the upper shank correspond to the same angle in the flat surfaces of the lower shank, with the surfaces in one shank being the mirror image of the surfaces in the other shank. When the flat surfaces of the lower shank are placed in contact with the corresponding flat surfaces of the upper shank the lips of the upper and lower shank will be in intimate contact and at such an angle that when the sleeve is dropped into position so as to embrace substantial portions of both the upper and lower shanks, the sleeve will restrain the lip of the lower shank from sliding over and being separated from the lip of the upper shank.

The invention is more easily described by reference to the drawings.

FIG. 1 is a perspective view of junction showing the electrode 1 with the lower shank 2 attached to electrode 1. Upper shank 3 is positioned above the lower shank 2 with the lower end of the upper shank being positioned in contact with the upper end of lower shank 2. Sleeve 4 embraces a substantial portion (in this case all) of the lower shank 2 and a substantial portion of the upper shank 3.

FIG. 2 is a perspective view of the same device as shown in FIG. 1 except that the various parts are shown disassembled. An opening is shown in electrode 1 into which the lower shank 2 is fitted. In this case the exterior dimension of lower shank 2 is such as to cause a tight fit with the surface of this opening. In other cases various other means may be used for affixing the lower shank to the electrode, such as threading, etc. At the upper end of lower shank 2, surfaces 5' and 6' are in substantially parallel plans which intersect the linear axis of shank 2, in this case at an angle of approximately 20°. Lip 7' has its surfaces at an angle of approximately 90° to surfaces 5' and 6'. The lower end of upper shank 3 has surfaces which are mirror images of those in the lower shank 2. Under surface 6 has substantially the same angle as surface 6' of the lower shank, and under surface 5 has substantially the same angle as the surface 5' in the lower shank. Lip 7 of the upper shank has the same dimensions and angle as lip 7' of the lower shank. Therefore when the upper shank 3 is abutted to lower shank 2 the surface 5 is in complete contact with 5' and surface 6 is in complete contact with surface 6', and likewise surfaces 7 are in contact with surfaces 7'. While these surfaces are being positioned into contact with each other sleeve 4 is held in a raised position, and after the two shaft ends are in abutment, the sleeve is lowered to the position shown in FIG. 4. The dimensions of the interior of sleeve 4 are very carefully controlled to correspond to the outer dimensions of shafts 2 and 3 so that when 4 is positioned as in FIG. 1 there is very little "play" between the outer shaft surfaces and the inner surface of the sleeve. This prevents lip 7 from sliding over lip 7' and thereby the shafts are prevented from separating. Opening 8 extends through the upper and lower shafts so that flushing oil may be emitted therethrough to the area below the electrode 1. In this way metal particles being removed by the electrical discharge may be flushed away from the areas being acted upon.

FIG. 3 shows a front elevational view with the sleeve shown in cross-section and the abutting ends of the upper and lower shafts being in contact with each other.

The electrodes can be of various shapes and sizes, such as circular as shown in the drawings, and also rectangular, square, triangular, as well as various irregular shapes depending upon the particular design desired to be cut into the metal object being worked upon. The thickness or depth of the electrode may be varied also to correspond to whatever may be most suitable for a particular operation.

A series of electrodes identical in shape but of slightly different dimensions may be used so as to successively erode an opening to exact dimension. For example, a first electrode may be used to erode an opening smaller than eventually desired, and finishing operations may be effected by one or two or more successive electrodes of slightly increasing size so that in the final operations less metal is removed and may be controlled to more exact dimensions. The design of this invention is particularly suited to such successive burning operations in view of the easy affixing, automatic registry and easy removal of electrodes. The exact registration of the electrodes is fixed by the angle of the lips 7 and 7' in the upper and lower shanks respectively.

The angle between the lip 7 and the flat surfaces 5 and 6, and also the angle between the lip 7' and flat surfaces 5' and 6' can be less than 90°, in which case there is even less chance of separating the abutting shank ends. However the 90° angle is easier to machine and provides sufficient resistance to separation when the sleeve is in position over the abutting shank ends. Nevertheless it is intended that angles of less than 90° are within the scope of this invention.

With regard to the angles of the flat surfaces 5, 6, 5' and 6', angles greater than 45° are considered less practical since greater areas than needed will have to be ground or machined. Theoretically angles approaching 60°–70° might even be used, but are less practical. Normally these angles are advantageously no greater than 30°.

The use of the junction of this invention is illustrated by the following example. This example is intended merely for illustrative purposes and is not intended in any way to limit the scope of the invention nor the manner in which it may be practiced.

EXAMPLE I

An electrode as shown in the drawings, having the design of upper and lower shanks, embracing sleeve and cylindrical electrode, is inserted and fastened into position in the collet chuck of an electric discharge machine available commercially under the trademark Spark-Matic E.D.M. This machine is operated at 220 volts, 60 cycle A.C. with 120 amperes output. The electrode is positioned above a piece of hardened tool steel of Rockwell C 60–62 hardness in appropriate position to make a desired opening one-half inch in diameter and the power turned on. Initially an electrode is used having a diameter of −0.490 inch and one-half inch thickness to rough out the opening to 2 inch depth, which took about 1 hour. Then this electrode is easily and quickly removed and just as easily replaced by a finishing electrode of 0.498 inch diameter, and the circular opening finished to one-half inch diameter +0.001 and −0.000 and depth of 2 inches. During the two operations the particles of metal being removed are flushed away by feeding through a one-eighth inch opening in the shanks and in the electrode as shown in FIG. 1. A dielectric fluid available on the market as "Cutzall No. 30" is used for this purpose.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. An easily replaceable electrode assembly comprising:
   a. an upper shaft, having a length substantially greater than its cross-sectional diameter and having its lower end consisting of two flat surfaces in substantially parallel planes and joined by a lip at an angle of approximately 90° to both of said flat surfaces, with the said flat surfaces being at an angle of at least 1° with the linear axis of the shaft, the horizontal cross-sections of said shaft being identical in shape and dimensions throughout at least a substantial part of the lower portion of said shaft;
   b. a lower shaft having its outer surface of identical shape and dimensions as the outer surface of said upper shaft, and having the upper end of said lower shaft having two flat surfaces in substantially parallel planes and the angle of said planes with the linear axis of said lower shaft being the same number of degrees as the angle which the flat surfaces of the lower end of the upper shaft have with the linear axis of said upper shaft, the flat surfaces of said upper end of said lower shaft being joined by a lip which corresponds in dimensions and its angle to said flat surfaces as the said lip in said upper shaft corresponds to the flat surfaces on said upper shaft, the horizontal cross-sections of a substantial portion of the upper part of said shaft being identical in shape and dimension to the lower part of said upper shaft;
   c. a sleeve having its interior opening corresponding in shape and dimension to the shape and dimension of said upper and lower shafts and having a length sufficient to embrace substantial portions of both said upper and lower shafts; and
   d. an electrode attached to the lower end of said lower shaft adapted for electrical discharge machining, said electrode having a radially extending surface engageable with the lower end of said sleeve to hold said sleeve in shaft-coupling position.

2. The junction of claim 1 in which said upper and lower shafts and said electrode have openings running substantially parallel to the linear axis thereof, the three said openings being aligned and communicating with each other so that fluid may be passed therethrough from the upper end of the said upper shaft to the underside of said electrode.

* * * * *